US011935999B2

United States Patent
Son et al.

(10) Patent No.: US 11,935,999 B2
(45) Date of Patent: Mar. 19, 2024

(54) LITHIUM SECONDARY BATTERY

(71) Applicant: LG CHEM, LTD., Seoul (KR)

(72) Inventors: Byoungkuk Son, Daejeon (KR);
Minchul Jang, Daejeon (KR);
Eunkyung Park, Daejeon (KR);
Junghun Choi, Daejeon (KR);
Changhun Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 513 days.

(21) Appl. No.: 16/336,756

(22) PCT Filed: Feb. 14, 2018

(86) PCT No.: PCT/KR2018/001911
§ 371 (c)(1),
(2) Date: Mar. 26, 2019

(87) PCT Pub. No.: WO2018/159950
PCT Pub. Date: Sep. 7, 2018

(65) Prior Publication Data
US 2021/0288349 A1      Sep. 16, 2021

(30) Foreign Application Priority Data

Mar. 3, 2017  (KR) .................. 10-2017-0027749

(51) Int. Cl.
*H01M 10/0565* (2010.01)
*H01M 4/38* (2006.01)
(Continued)

(52) U.S. Cl.
CPC ....... *H01M 10/0565* (2013.01); *H01M 4/382* (2013.01); *H01M 4/405* (2013.01);
(Continued)

(58) Field of Classification Search
CPC ....... H01M 10/05–0569; H01M 4/382; H01M 4/405; H01M 2300/0028; H01M 2300/0085
See application file for complete search history.

(56) References Cited

U.S. PATENT DOCUMENTS

2004/0072066 A1   4/2004   Cho et al.
2012/0129045 A1*  5/2012   Gin ................... H01M 10/0565
                                                429/189
(Continued)

FOREIGN PATENT DOCUMENTS

CN      102738442 A    10/2012
CN      105390743 A     3/2016
(Continued)

OTHER PUBLICATIONS

Machine Translation of KR20160026648(Lee) (Year: 2016).*
(Continued)

*Primary Examiner* — Matthew T Martin
*Assistant Examiner* — Ankith R Sripathi
(74) *Attorney, Agent, or Firm* — Birch, Stewart, Kolasch & Birch, LLP (57) ABSTRACT

A lithium secondary battery, in which, by using different electrolytes in a positive electrode and a negative electrode, and using a gel polymer electrolyte, in which a small amount of an electrolyte liquid is impregnated into a polymer matrix, between the negative electrode and the separator, the stability and performance of the electrode may be improved, and therefore, the performance and lifetime of the lithium secondary battery may be enhanced.

8 Claims, 1 Drawing Sheet

(51) Int. Cl.
  *H01M 4/40*       (2006.01)
  *H01M 10/052*     (2010.01)
  *H01M 10/0567*    (2010.01)
  *H01M 10/0569*    (2010.01)

(52) U.S. Cl.
  CPC ..... *H01M 10/052* (2013.01); *H01M 10/0567* (2013.01); *H01M 10/0569* (2013.01); *H01M 2300/0028* (2013.01); *H01M 2300/0085* (2013.01)

(56) References Cited

U.S. PATENT DOCUMENTS

| | | | |
|---|---|---|---|
| 2013/0260257 A1 | 10/2013 | Choi | |
| 2014/0093774 A1 | 4/2014 | Yoon | |
| 2015/0311492 A1 | 10/2015 | Wang et al. | |
| 2016/0020488 A1* | 1/2016 | Cho | C07D 213/57 429/188 |
| 2016/0064770 A1 | 3/2016 | Lee et al. | |
| 2016/0240887 A1* | 8/2016 | Hatta | H01M 10/4257 |
| 2016/0301098 A1* | 10/2016 | He | H01M 10/058 |
| 2017/0018799 A1* | 1/2017 | Jeong | H01M 10/0565 |
| 2017/0125868 A1* | 5/2017 | Kim | H01M 10/0565 |
| 2017/0288267 A1* | 10/2017 | Peng | H01M 10/0525 |
| 2017/0288269 A1* | 10/2017 | Moganty | H01M 10/0567 |
| 2017/0305869 A1* | 10/2017 | Moganty | H01M 10/0569 |
| 2018/0034029 A1* | 2/2018 | Shang | H01M 10/0525 |
| 2020/0028211 A1* | 1/2020 | Morizur | H01M 10/052 |

FOREIGN PATENT DOCUMENTS

| | | | |
|---|---|---|---|
| CN | 105874642 A | 8/2016 | |
| EP | 3 442 068 A1 | 2/2019 | |
| JP | 59-173977 A | 10/1984 | |
| JP | 2001-345121 A | 12/2001 | |
| JP | 2015-230801 A | 12/2015 | |
| KR | 10-0449765 B1 | 9/2004 | |
| KR | 10-2009-0055224 A | 6/2009 | |
| KR | 10-1120238 B1 | 3/2012 | |
| KR | 10-2013-0111833 A | 10/2013 | |
| KR | 10-1336943 B1 | 12/2013 | |
| KR | 10-2014-0125970 A | 10/2014 | |
| KR | 10-2016-0009399 * | 1/2016 | .......... H01M 10/052 |
| KR | 10-2016-0009399 A | 1/2016 | |
| KR | 20160009399 * | 1/2016 | ........ H01M 10/0567 |
| KR | 20160009399 A * | 1/2016 | ........ H01M 10/0567 |
| KR | 10-2016-0026648 A | 3/2016 | |
| KR | 10-2016-0034183 A | 3/2016 | |
| KR | 20160026648 * | 3/2016 | |
| KR | 20160026648 A * | 3/2016 | |
| KR | 10-2016-0052351 A | 5/2016 | |
| KR | 10-2016-0102409 A | 8/2016 | |
| KR | 10-2016-0102409 * | 8/2016 | .......... H01M 10/052 |
| KR | 20160102409 * | 8/2016 | ............ H01M 4/623 |
| KR | 20160102409 A * | 8/2016 | ............ H01M 4/623 |
| KR | 10-2018-0036573 A | 4/2018 | |
| WO | WO 2018/062882 A1 | 4/2018 | |

OTHER PUBLICATIONS

Chamaani et al., One-Dimensional Glass Micro-Fillers in Gel Polymer Electrolytes for Li—O2 Battery Applications, Electrochimica Acta, vol. 235, 2017, pp. 56-63, (Year: 2017).*
European Search Report for Appl. No. 18761378.1 dated Aug. 8, 2019.
International Search Report issued in PCT/KR2018/001911 (PCT/ISA/210), dated May 30, 2018.

* cited by examiner

LITHIUM SECONDARY BATTERY

TECHNICAL FIELD

This application claims priority to and the benefits of Korean Patent Application No. 10-2017-0027749, filed with the Korean Intellectual Property Office on Mar. 3, 2017, the entire contents of which are incorporated herein by reference.

The present invention relates to a lithium secondary battery, and in particular, to a lithium secondary battery designed to increase stability of a lithium metal electrode and exhibit more superior performance and lifetime property.

BACKGROUND ART

With increases in technology developments and demands for mobile devices, demands for secondary batteries as an energy source have rapidly increased. Among such secondary batteries, lithium secondary batteries having high energy density and operating potential, a long cycle life and a low self-discharge rate have been commercialized and widely used.

In addition, as interests in environmental problems have recently increased, extensive studies on electric vehicles (EV), hybrid electric vehicles (HEV) and the like that may replace vehicles using fossil fuel such as gasoline vehicles and diesel vehicles, one of major reasons of air pollution, have been progressed. Nickel hydrogen metal (Ni-MH) secondary batteries are normally used as a power source of such electric vehicles (EV), hybrid electric vehicles (HEV) and the like, however, studies on using lithium secondary batteries having high energy density, high discharge voltage and output stability have been actively progressed and some of these have been commercialized.

A lithium secondary battery has a structure of laminating or winding an electrode assembly including a positive electrode, a negative electrode, and a separator provided between the positive electrode and the negative electrode, and is formed by embedding this electrode assembly in a battery case, and injecting a non-aqueous electrolyte liquid thereinto. Such a lithium secondary battery is charged and discharged while repeating a process of lithium ions of the positive electrode being intercalated and deintercalated to the negative electrode. Capacity of a lithium secondary battery varies depending on the types of an electrode active material, however, needs for increasing capacity and enhancing stability have consistently arisen.

Accordingly, more lithium ions are capable of being intercalated and deintercalated through an alloying reaction with lithium, and metal-based materials such as silicon (4,200 mAh/g) or tin (990 mAh/g) exhibiting a high capacity property have been used as a negative electrode active material. However, when using metals such as silicon or tin as a negative electrode active material, the volume greatly expands by approximately 4 times in a process of alloying with lithium during charge, and contracts during discharge. With such considerable changes in the electrode volume repeatedly occurring during charge and discharge, the active material is slowly micronized and eliminated from the electrode causing a rapid capacity decrease, which makes commercialization difficult.

Compared to the negative electrode active material mentioned above, lithium metal has excellent theoretical energy density of 3,860 mAh/g, and has very low standard reduction potential (standard hydrogen electrode; SHE) of −3.045 V facilitating the obtaining of high capacity and high energy density batteries, and with recently increased interests on lithium-sulfur and lithium-air batteries, lithium metal has been actively studied as a negative electrode active material of a lithium secondary battery.

However, when using lithium metal as a negative electrode of a lithium secondary battery, lithium metal reacts with an electrolyte liquid, impurities, a lithium salt and the like to form a passivation layer (solid electrolyte interphase; SEI), and such a passivation layer causes a local difference in the current density facilitating dendritic dendrite formation by the lithium metal during charge, and causes an internal short circuit between the positive electrode and the negative electrode by gradually growing during charge and discharge. In addition, dendrite has a mechanical bottle neck, and forms dead lithium losing an electric contact with a current collector during discharge reducing battery capacity, shortening a cycle life, and having unfavorable effects on battery stability. Due to such nonuniformity of an oxidation and reduction reaction of the lithium metal negative electrode and reactivity with the electrolyte liquid, a lithium secondary battery using lithium metal as a negative electrode has not been commercialized yet.

In view of the above, various methods such as introducing a polymer protective layer or an inorganic solid protective layer on a lithium metal surface, increasing a lithium salt of an electrolyte liquid, or introducing proper additives have been studied.

As one example, Korean Patent Application Laid-Open Publication No. 2009-0055224 discloses that an electrode surface may be protected from an electrolyte liquid by forming a polyimide protective layer on a lithium electrode surface.

In addition, Korean Patent Application Laid-Open Publication No. 2016-0052351 discloses that lithium dendrite growth is suppressed by including a lithium dendrite absorbing material in a polymer protective layer formed on a lithium metal surface, which may improve stability and lifetime properties of a lithium secondary battery.

These patents have somewhat stabilized a lithium metal surface, however, the effect is not sufficient. In addition, a protective layer becomes hard during charge and discharge, or degeneration such as swelling occurs when in contact with an electrolyte liquid making the application in lithium secondary batteries difficult. In addition thereto, changing an electrolyte composition or adding a separate protective layer requires considerable time and costs, and is uneconomical. Accordingly, development of a lithium secondary battery capable of enhancing charge and discharge efficiency and lifetime properties of the lithium secondary battery by improving a problem of lithium metal electrode instability has been much required.

PRIOR ART DOCUMENTS

Patent Documents (Patent Document 1) Korean Patent Application Laid-Open Publication No. 2009-0055224 (2009.06.02), Lithium metal battery including polyimide and method for manufacturing the same (Patent Document 2) Korean Patent Application Laid-Open Publication No. 2016-0052351 (2016.05.12), Lithium metal electrode having stable protective layer and lithium secondary battery including the same

DISCLOSURE

Technical Problem

As a result of extensive studies in view of the above, the inventors of the present invention have identified that, by introducing a gel polymer electrolyte or a liquid electrolyte comprising a most efficient organic solvent to a positive electrode and a negative electrode, respectively, and forming the gel polymer electrolyte introduced to the negative electrode to have a small amount of an electrolyte liquid impregnated into a polymer matrix, efficiency and stability of the positive electrode and the negative electrode are improved, which resultantly enhances battery performance.

Accordingly, an aspect of the present invention provides a lithium secondary battery comprising a gel polymer electrolyte comprising an ether-based solvent in a negative electrode, and comprising a liquid electrolyte including a carbonate-based solvent in a positive electrode.

Technical Solution

According to an aspect of the present invention, there is provided a lithium secondary battery including a positive electrode, a negative electrode, a separator provided between the positive electrode and the negative electrode, a gel polymer electrolyte included between the negative electrode and the separator, the gel polymer electrolyte including an electrolyte liquid and a polymer matrix, wherein the electrolyte liquid is impregnated into the polymer matrix in an amount of 30% by weight or less and preferably in 10% by weight to 20% by weight with respect to a total weight of the gel polymer electrolyte in the gel polymer electrolyte, and a liquid electrolyte included between the positive electrode and the separator.

The negative electrode may comprise lithium metal or a lithium alloy.

In the gel polymer electrolyte, an electrolyte liquid comprising an ether-based solvent and a lithium salt may be impregnated into a polymer matrix.

The liquid electrolyte included between the positive electrode and the separator may comprise a carbonate-based solvent and a lithium salt.

The polymer matrix is formed with a crosslinked polymer, and the crosslinked polymer may be one or more types selected from the group consisting of acryl-based polymers, urethane-based polymers and ether-based polymers.

According to another aspect of the present invention, there is provided a lithium secondary battery including a positive electrode, a negative electrode, a separator provided therebetween, a gel polymer electrolyte and a liquid electrolyte, wherein the gel polymer electrolyte is included between the negative electrode and the separator, wherein the liquid electrolyte is included between the positive electrode and the separator, and wherein an electrolyte liquid is impregnated into a polymer matrix in 30% by weight or less with respect to a total weight of the gel polymer electrolyte in the gel polymer electrolyte.

Advantageous Effects

A lithium secondary battery according to the present invention uses a gel polymer electrolyte comprising an ether-based solvent in a negative electrode and uses a liquid electrolyte comprising a carbonate-based solvent in a positive electrode to manufacture the lithium secondary battery, and as a result, a lithium secondary battery capable of satisfying long-term charge and discharge efficiency and cycle properties while having a high output can be provided.

In addition, in the lithium secondary battery according to the present invention, the gel polymer electrolyte included between the negative electrode and a separator is formed so as to impregnate a small amount of an electrolyte liquid into a polymer matrix, and therefore, the electrolyte liquid each included in the positive electrode side and the negative electrode side and an electrolyte liquid additionally added when manufacturing the battery are not mixed, which can improve battery stability.

Furthermore, the polymer matrix of the gel polymer electrolyte is formed with a crosslinked polymer, and therefore, enhances battery durability as well as battery stability by having excellent adhesive strength for the negative electrode and the separator, while having mechanical properties capable of maintaining a form of loading an electrolyte liquid into the polymer matrix.

BEST MODE

Hereinafter, the present invention will be described in detail with reference to accompanying drawings. Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Accordingly, drawings described in the present specification and constitutions described in the embodiments are just one most preferred embodiment of the present invention, and do not represent all technological ideas of the present invention, and therefore, it needs to be understood that various equivalents and modification examples that may replace these may be present at the time of application of the present invention.

As the information and communication industry is rapidly developed and applications of lithium secondary batteries expand starting from mobile phones, wireless electronic devices to electric vehicles, demands for the development of lithium secondary batteries that may be smaller, lighter, thinner and portable, and having high performance and high stability have increased.

Responding to such demands, lithium metal batteries (LMB) using lithium metal as a negative electrode have recently received attentions. Lithium metal has high energy density (3,860 mAh/g) while having low oxidation/reduction potential (−3.045 V vs standard hydrogen electrode) and atomic weight (6.94 g/a.u.), and is expected as a negative electrode material of high capacity lithium secondary batteries.

However, when using lithium metal as a negative electrode, the lithium metal reacts with an organic solvent or a lithium salt forming an electrolyte, impurities present in a battery, and the like to produce a passivation layer, and this passivation layer causes a local current density difference forming dendritic lithium dendrite. The lithium dendrite causes a battery internal short circuit and dead lithium as well as reducing a lifetime of a lithium secondary battery, which increases physical and chemical instability of the lithium secondary battery and results in adverse effects on charge and discharge capacity. In addition thereto, the passivation layer is thermally unstable and, when a battery is continuously charged and discharged or, particularly, stored at a high temperature in a completely charged state, may slowly collapse by increased electrochemical energy and thermal energy. Due to such collapse of the passivation layer, a side reaction of the exposed lithium metal surface directly reacting with an electrolyte liquid solvent and being decomposed consistently occurs, and as a result, resistance of the negative electrode increases, and charge and discharge efficiency of the battery decreases. In addition, the electrolyte solvent is consumed when forming the passivation layer, and there is a problem in that a battery lifetime is reduced due to byproducts, gas and the like produced during various side reactions such as the passivation layer formation and collapse, and electrolyte liquid decomposition.

For this, a method such as changing an electrolyte composition, introducing a separate protective layer on a lithium metal surface, or the like has been used in the art, however, stability of a lithium metal electrode has not been effectively improved.

In view of the above, the present invention provides a lithium secondary battery including a most efficient electrolyte in each of a positive electrode and a negative electrode in order to increase stability of the lithium metal electrode and secure effects of improving charge and discharge properties and lifetime of the lithium secondary battery, and having a stable structure so that the electrolytes included in each of the positive electrode and the negative electrode are not mixed with each other.

Specifically, the lithium secondary battery according to the present invention comprises a positive electrode, a negative electrode, a separator provided between the positive electrode and the negative electrode and an electrolyte, wherein a gel polymer electrolyte is included between the negative electrode and the separator, wherein a liquid electrolyte is included between the positive electrode and the separator, and an electrolyte liquid is impregnated into a polymer matrix in 30% by weight or less with respect to a total weight of the gel polymer electrolyte in the gel polymer electrolyte.

Figure 1:
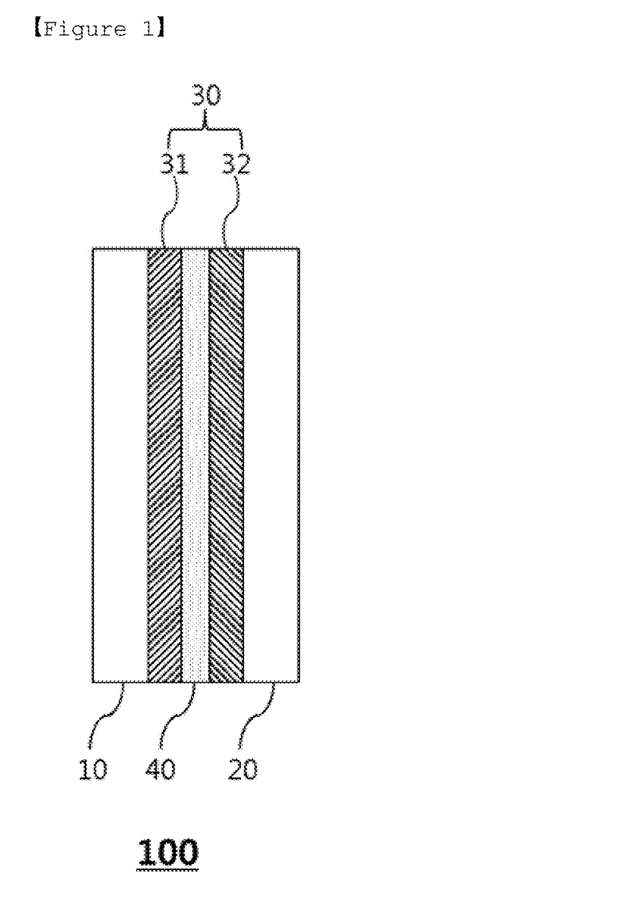
FIG. 1 is a sectional diagram illustrating a lithium secondary battery according to one embodiment of the present invention.
Figure 2:
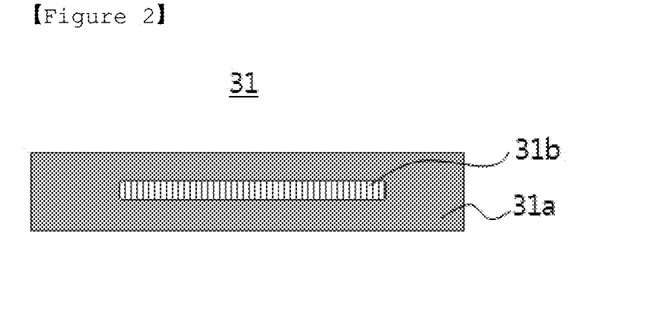
FIG. 2 is a sectional diagram illustrating a gel polymer electrolyte according to one embodiment of the present invention.

FIG. 1 is a sectional diagram illustrating a lithium secondary battery according to one embodiment of the present invention, and FIG. 2 is a sectional diagram illustrating a gel polymer electrolyte included in the lithium secondary battery according to one embodiment of the present invention.

When referring to FIG. 1, the lithium secondary battery (100) according to one embodiment of the present invention includes a positive electrode (20), a negative electrode (10), and a separator (40) provided between the positive electrode (20) and the negative electrode (10) and an electrolyte (30), and herein, a gel polymer electrolyte (31) is included between the negative electrode (10) and the separator (40), and a liquid electrolyte (32) is included between the positive electrode (20) and the separator (40).

When referring to FIG. 2, an electrolyte liquid (31b) is impregnated into a polymer matrix (31a) in the gel polymer electrolyte (31), and the content of the electrolyte liquid (31b) may be 30% by weight or less, and preferably from 10% by weight to 20% by weight based on the total weight of the gel polymer electrolyte (31).

When the content of the electrolyte liquid (31b) increases to greater than 30% by weight, a form of simply mixing the electrolyte liquid and the polymer matrix is obtained rather than having a form of loading the electrolyte liquid into the polymer matrix, which may cause a problem of being mixed with an electrolyte liquid injected to the liquid electrolyte (32) on the positive electrode (20) side.

In addition, the content of the electrolyte liquid (31b) may be preferably from 10% by weight to 20% by weight in order to prevent an increase in the battery resistance. For example, when the content of the electrolyte liquid (31b) is greater than 0% by weight and less than 10% by weight, the problem of being mixed with an electrolyte liquid injected to the liquid electrolyte (32) on the positive electrode (20) side may be prevented, however, a problem of an increase in the battery resistance may occur. In addition, when the content is greater than 20% by weight and less than or equal to 30% by weight, the problem of being mixed with an electrolyte liquid injected to the liquid electrolyte (32) on the positive electrode (20) side may also be prevented, however, some of the solvent of the electrolyte liquid in the gel polymer electrolyte (31) electrochemically reacts with the negative electrode to form an unstable SEI layer, which may somewhat accelerate battery degeneration.

Electrolytes generally used in a lithium secondary battery comprise a liquid electrolyte dissolving a lithium salt in an organic solvent, and a gel polymer electrolyte impregnating this liquid electrolyte into a polymer material. The liquid electrolyte has high ion conductivity and is uniformly dispersed, and therefore, is advantageous for high current charge since lithium ions are sufficiently diffused into an electrode, however, due to the organic solvent, a separator, a special protective circuit and the like need to be installed for securing stability. Meanwhile, the gel polymer electrolyte secures superior stability and may be designed to have various shapes since there is no concern of organic solvent outflow and the electrolyte performs a role of a separator at the same time, however, the gel polymer electrolyte has a problem of poor lifetime property due to low ion conductivity compared to the liquid electrolyte and its nonuniform dispersion property. In addition thereto, the electrolyte exhibits different properties depending on types of an electrode active material, types of an organic solvent included in an electrolyte, and battery operating conditions.

In view of the above, the present invention introduces an electrolyte including a specific organic solvent suitable for an active material used in a negative electrode and a positive electrode of a lithium secondary battery. In other words, when using lithium metal as a negative electrode, a gel polymer electrolyte including an ether-based solvent is included in the negative electrode, and a liquid electrolyte including a carbonate-based solvent is included in a positive electrode, and as a result, advantages of each electrolyte are maximized, and particularly, reaction efficiency and stability of the lithium metal electrode are enhanced, which provides a lithium secondary battery having improved charge and discharge efficiency and lifetime property.

The positive electrode (20) may include a positive electrode current collector and a positive electrode active material layer coated on one surface or both surfaces of the positive electrode current collector.

The positive electrode current collector is not particularly limited as long as it supports the positive electrode active material layer and has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with a positive electrode active material by forming micro-unevenness on its surface, and various forms such as films, sheets, foil, meshes, nets, porous bodies, foams and non-woven fabrics may be used.

The positive electrode active material layer may include a positive electrode active material, and selectively, a conductor and a binder.

Examples of the positive electrode active material may comprise layer compounds such as lithium cobalt oxide ($LiCoO_2$) or lithium nickel oxide ($LiNiO_2$) or compounds substituted with one or more transition metals; lithium manganese oxide such as a chemical formula of $Li_{1+x}Mn_{2-x}O_4$ ($0 \leq x \leq 0.33$), $LiMnO_3$, $LiMn_2O_3$ or $LiMnO_2$; lithium copper oxide ($Li_2CuO_2$); vanadium oxide such as $LiV_3O_8$, $LiFe_3O_4$, $V_2O_5$ or $Cu_2V_2O_7$; Ni site-type lithium nickel oxide represented by a chemical formula of $LiNi_{1-x}M_xO_2$ (M=Co, Mn, Al, Cu, Fe, Mg, B or Ga; $0.01 \leq x \leq 0.3$); lithium manganese composite oxide represented by a chemical formula of $LiMn_{2-x}M_xO_2$ (M=Co, Ni, Fe, Cr, Zn or Ta; $0.01 \leq x \leq 0.1$) or $Li_2Mn_3MO_3$ (M=Fe, Co, Ni, Cu or Zn); spinel-structured lithium manganese composite oxide represented by $LiNi_xMn_{2-x}O_4$; $LiMn_2O_4$ in which some of Li in the chemical formula are substituted with alkaline earth metal ions; disulfide compounds; $Fe_2(MoO_4)_3$ and the like, but are not limited thereto. Preferably, the positive electrode active material may be one or more types selected from the group consisting of lithium cobalt oxide, lithium nickel oxide and lithium manganese oxide. More preferably, the positive electrode active material may be lithium cobalt oxide.

The conductor is for enhancing electrical conductivity, and is not particularly limited as long as it is an electron conducting material without inducing chemical changes in a lithium secondary battery.

Generally, carbon black, graphite, carbon fibers, carbon nanotubes, metal powders, conductive metal oxides, organic conductors or the like may be used, and as products commercially-available as a conductor, acetylene black series (products of Chevron Chemical Company, Gulf Oil Company or the like), ketjen black EC series (products of Armak Company), Vulcan XC-72 (products of Cabot Company), Super-P (products of MMM) and the like may be included. For example, acetylene black, carbon black, graphite and the like may be included.

In addition, the positive electrode active material layer may further comprise a binder having functions of maintaining the positive electrode active material on the current collector for a positive electrode, and linking the active materials. As the binder, various types of binders such as, for example, polyvinylidene fluoride-hexafluoropropylene (PVDF-co-HFP), polyvinylidene fluoride (PVDF), polyacrylonitrile, polymethyl methacrylate, styrene-butadiene rubber (SBR) or carboxylmethylcellulose (CMC).

The negative electrode (10) may include a negative electrode current collector and a negative electrode active material layer located on the negative electrode current collector. Alternatively, the negative electrode (10) may be a lithium metal plate.

The negative electrode current collector is for supporting the negative electrode active material layer, and is not particularly limited as long as it has excellent conductivity and is electrochemically stable in a voltage region of a lithium secondary battery. For example, copper, stainless steel, aluminum, nickel, titanium, palladium, baked carbon, copper or stainless steel of which surface is treated with carbon, nickel, silver or the like, aluminum-cadmium alloys and the like may be used.

The negative electrode current collector may strengthen binding strength with a negative electrode active material by forming micro-unevenness on its surface, and various forms such as films, sheets, foil, meshes, nets, porous bodies, foams and non-woven fabrics may be used.

The thickness of the negative electrode current collector is not particularly limited, and may be properly determined depending on the application. For example, the current collector may have a thickness of 3 µm to 500 µm, preferably 5 µm to 100 µm and more preferably 5 µm to 50 µm. When the thickness of the current collector is less than the above-mentioned range, durability decreases, and when the thickness is greater than the above-mentioned range, capacity per volume of a lithium secondary battery may decrease.

The negative electrode active material layer may include materials capable of reversibly intercalating or deintercalating lithium ions, materials capable of reversibly forming a lithium-containing compound by reacting with lithium ions, lithium metal or lithium alloys. The negative electrode active material layer may have a form of a lithium metal thin film or lithium metal powder on the negative electrode current collector.

A method of forming the negative electrode active material layer is not particularly limited, and methods for forming a layer or film commonly used in the art may be used. For example, methods such as compression, coating or deposition may be used. In addition, a case of assembling a battery with no lithium thin film on a current collector and then forming a metal lithium thin film on a metal plate by initial charge is also included in the negative electrode (10) of the present invention.

The negative electrode active material layer or the lithium metal plate may have its width adjusted depending on the form of an electrode so that the electrode is readily prepared. In addition, the thickness of the negative electrode active material layer or the lithium metal plate is not particularly limited as well, but may be, for example, from 5 µm to 200 µm and preferably from 10 µm to 100 µm. When the lithium metal layer thickness is in the above-mentioned range, ions and electrons in the negative electrode may be smoothly transferred.

The separator (40) is for physically separating both electrodes in the lithium secondary battery of the present invention, and is not particularly limited as long as it is commonly used as a separator in a lithium secondary battery, and those having an excellent electrolyte moisture-containing ability while having low resistance for ion migration of the electrolyte are particularly preferred.

The separator (40) may be formed with a porous base, and as the porous base, porous bases commonly used in electrochemical devices may all be used. Examples thereof may include polyolefin-based porous membranes or non-woven fabrics, but are not limited thereto.

Examples of the polyolefin-based porous membrane may include membranes formed with a polyolefin-based polymer such as polyethylene including high density polyethylene, linear low density polyethylene, low density polyethylene or ultra-high molecular weight polyethylene, polypropylene, polybutylene and polypentene either alone or formed with a polymer mixing these.

As the non-woven fabric other than polyolefin-based non-woven fabric, non-woven fabrics formed with, for example, polyethylene terephthalate, polybutylene terephthalate, polyester, polyacetal, polyamide, polycarbonate, polyimide, polyetheretherketone, polyether sulfone, polyphenylene oxide, polyphenylene sulfide, polyethylene naphthalate and the like alone, or formed with a polymer obtained by mixing these may be included. The non-woven fabric may have a structure of a spunbond non-woven fabric or a meltblown non-woven fabric formed with long fibers.

The thickness of the porous base is not particularly limited, but may be from 1 µm to 100 µm and preferably from 5 µm to 50 µm.

Sizes of the pores present in the porous base and porosity are not particularly limited as well, but may be from 0.001 µm to 50 µm and 10% to 95%, respectively.

The electrolyte (30) comprises lithium ions, is for producing an electrochemical oxidation or reduction reaction in the positive electrode and the negative electrode through a medium thereof, and includes a gel polymer electrolyte (31) and a liquid electrolyte (32).

The gel polymer electrolyte (31) is included between the negative electrode (10) and the separator (40), and has a form of an electrolyte liquid including an ether-based solvent and a lithium salt being impregnated into a polymer matrix.

The ether-based solvent performs a role of a medium through which ions involving in an electrochemical reaction of a lithium secondary battery may migrate. Particularly, when the lithium secondary battery (100) according to the present invention comprises the ether-based solvent, efficiency with lithium metal used in the negative electrode (10) is high increasing the degree of ion dissociation, and as a result, ion conduction may become smoother.

The ether-based solvent may comprise one or more types selected from the group consisting of dimethyl ether, diethyl ether, dibutyl ether, ethylene glycol dimethyl ether, diethylene glycol dimethyl ether, diethylene glycol diethyl ether, triethylene glycol dimethyl ether, triethylene glycol diethyl ether, 1,3-dioxolane, 4-methyldioxolane, 1,4-dioxane, 3,5-dimethyl isoxazole, 2,5-dimethylfuran, furan, 2-methylfuran, tetrahydrofuran and 2-methyltetrahydrofuran. Preferably, the ether-based solvent may be one or more types selected from the group consisting of ethylene glycol dimethyl ether, diethylene glycol dimethyl ether, diethylene glycol diethyl ether, triethylene glycol dimethyl ether, triethylene glycol diethyl ether and 1,3-dioxolane. More specifically, the ether-based solvent may be one or more types selected from the group consisting of ethylene glycol dimethyl ether, diethylene glycol dimethyl ether and 1,3-dioxolane.

The electrolyte liquid is formed by dissolving a lithium salt together with the ether-based solvent. Herein, the lithium salt functions as a supply source of lithium ions in the battery enabling basic operation of a lithium secondary battery.

The lithium salt is not limited as long as it is commonly used in an electrolyte liquid for a lithium secondary battery. Examples thereof may include LiCl, LiBr, LiFSI, LiI, LiClO$_4$, LiAlO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, (C$_2$F$_5$SO$_2$)$_2$NLi, LiC$_4$F$_9$SO$_3$, chloroborane lithium, lower aliphatic carboxylic acid lithium, lithium tetraphenylborate and the like.

The concentration of the lithium salt may be from 0.2 M to 2 M, specifically from 0.6 M to 2 M and more specifically from 0.7 M to 1.7 M depending on various factors such as an accurate composition of the electrolyte solvent mixture, solubility of the salt, conductivity of the dissolved salt, charge and discharge conditions of a battery, a working temperature, and other factors known in the lithium battery field. When the lithium salt concentration is less than 0.2 M, conductivity of the electrolyte may decrease causing decline in the battery performance, and when the lithium salt concentration is greater than 2 M, viscosity of the electrolyte increases leading to a decrease in the lithium ion mobility.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the lithium salt-containing electrolyte liquid. In some cases, halogen-containing solvents such as carbon tetrachloride and trifluoroethylene may be further included in order to provide nonflammability, carbon dioxide gas may be further included in order to enhance high temperature storage properties, and fluoro-ethylene carbonate (FEC), propene sultone (PRS) and the like may be further included.

When mixing the electrolyte liquid having such a composition and a crosslinked polymer, then coating the result on the negative electrode and then curing the result, the crosslinked polymer forms a matrix-type polymer matrix, and the electrolyte liquid is placed in a state impregnated into the polymer matrix, and the gel polymer electrolyte may be prepared.

Herein, the polymer matrix needs to have properties of excellent mechanical strength and not being dissolved in the electrolyte liquid so that the status of the electrolyte liquid being impregnated thereinto may be maintained. In addition, the polymer matrix needs to exhibit strong binding strength with the separator (40) and the negative electrode (10) while having excellent lithium ion dissociation capacity, and for this, needs to hydrophobicity or affinity with materials forming the separator (40) and the negative electrode (10).

The polymer matrix may be formed with a crosslinked polymer, and the polymer matrix formed with a crosslinked polymer may be a crosslinked polymer having a three-dimensional network structure.

Specifically, the crosslinked polymer may be one or more types selected from the group consisting of acryl-based polymers, urethane-based polymers and ether-based polymers.

The acryl-based polymer may be a polymer of a monomer having two or more functional groups, or a copolymer of a monomer having two or more functional groups and a polar monomer having one functional group.

The monomer having two functional groups may be one or more selected from the group consisting of trimethylolpropane ethoxylate triacrylate, polyethylene glycol dimethacrylate, polyethylene glycol diacrylate, divinylbenzene, polyester dimethacrylate, divinyl ether, trimethylolpropane, trimethylolpropane trimethacrylate and ethoxylated bisphenol A dimethacrylate.

In addition, the polar monomer having one functional group may be one or more selected from the group consisting of methyl methacrylate, ethyl methacrylate, butyl methacrylate, methyl acrylate, butyl acrylate, ethylene glycol methyl ether acrylate, ethylene glycol methyl ether methacrylate, acrylonitrile, vinyl acetate, vinyl chloride and vinyl fluoride.

The gel polymer electrolyte (31) is prepared by impregnating the electrolyte liquid comprising an ether-based solvent and a lithium salt into the polymer matrix, and then gelling the result through irradiating heat or light, and herein, a pyrolytic initiator or a photolytic initiator may be further added in order to facilitate gelation by heat or light.

Specific examples of the pyrolytic initiator include peroxide initiators, ester-based initiators, azo-based initiators or the like, and as the photolytic initiator, commonly used photolytic initiators are used. Herein, the pyrolytic initiator or the photolytic initiator is added in 0.5 parts by weight to 7 parts by weight with respect to 100 parts by weight of the polymer matrix.

The liquid electrolyte (32) is included between the positive electrode (20) and the separator (40), and includes a carbonate-based solvent and a lithium salt.

In the present invention, high voltage stability may be secured by using a liquid electrolyte including a carbonate-based solvent between the positive electrode (20) and the separator (40).

The carbonate-based solvent may comprise one or more types selected from the group consisting of ethylene carbonate, propylene carbonate, 1,2-butylene carbonate, 2,3-butylene carbonate, 2,3-pentylene carbonate, dimethyl carbonate, diethyl carbonate, ethylmethyl carbonate, dipropyl carbonate, methylpropyl carbonate and ethylpropyl carbonate. Preferably, the carbonate-based solvent may be one or more types selected from the group consisting of ethylene carbonate, propylene carbonate, dimethyl carbonate, diethyl carbonate and dipropyl carbonate. More preferably, the carbonate-based solvent may be one or more types selected from the group consisting of ethylene carbonate, dimethyl carbonate and diethyl carbonate.

The lithium salt is the same as described in the gel polymer electrolyte (31).

Accordingly, the present invention includes a lithium secondary battery comprising a positive electrode, a negative electrode, and a separator provided therebetween, a gel polymer electrolyte and a liquid electrolyte, wherein the gel polymer electrolyte comprises an ether-based solvent and the liquid electrolyte includes a carbonate-based solvent.

As described above, the lithium secondary battery (100) according to one embodiment of the present invention comprises a gel polymer electrolyte (31) between a negative electrode (10) and a separator (40), and comprises a liquid electrolyte (32) between a positive electrode (20) and the separator (40). Herein, the gel polymer electrolyte (31) comprises an ether-based solvent and the liquid electrolyte (32) comprises a carbonate-based solvent. Using an ether-based solvent in the negative electrode (10) may increase reaction efficiency with lithium metal, a negative electrode active material, and using an electrolyte in a gel-type polymer state minimizes a direct reaction with an electrolyte liquid and prevents metal ions eluted from the positive electrode from migrating to the negative electrode, or reducing metal precipitation in the negative electrode, and as a result, stability of the lithium metal electrode may be improved. In addition, using a carbonate-based solvent in the positive electrode (20) may secure high voltage stability and resolve a problem of internal resistance increase, and by the reaction area between the electrolyte liquid in a liquid state and the positive electrode active material becoming uniform and widening, an effective electrochemical reaction may be obtained. As a result, charge and discharge efficiency and lifetime of a lithium secondary battery may be enhanced, and an excellent battery capacity property is obtained even when charged with a high voltage as well as a general voltage.

A method for manufacturing a lithium secondary battery having the constitutions described above is not particularly limited, and known methods may be used.

In addition, the shape of the lithium secondary battery of the present invention is not particularly limited, and various shapes such as a cylinder-type, a lamination-type or a coin-type capable of operating as a battery may be employed.

In addition, the present invention provides a battery module comprising the lithium secondary battery as a unit cell, and provides a battery pack comprising the battery module.

The battery pack may be used as a power supply of medium to large-sized devices requiring high temperature stability, long cycle and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooters and the like; electric golf carts; systems for power storage and the like, but are not limited thereto.

In the lithium secondary battery according to the present invention, the gel polymer electrolyte and the liquid electrolyte may additionally each comprise an additive for enhancing stability.

The additive may be a sulfonylmethyl isocyanide-based compound represented by the following Chemical Formula 1:

[Chemical Formula 1]

In the formula, R1 is a substituted or unsubstituted alkyl group having 1 to 20 carbon atoms; an alkoxy group having 1 to 20 carbon atoms; an alkenyl group having 2 to 20 carbon atoms; an alkenyloxy group having 2 to 20 carbon atoms; a cycloalkyl group having 4 to 20 carbon atoms; a cycloalkenyl group having 4 to 20 carbon atoms; an alkynyl group having 2 to 20 carbon atoms; an aryl group having 6 to 20 carbon atoms, and R2 is a substituted or unsubstituted aliphatic, alicyclic or aromatic hydrocarbon group.

R1 may be a substituted or unsubstituted aryl group having 6 to 20 carbon atoms.

In addition, the aliphatic hydrocarbon group may be an alkyl group having 1 to 20 carbon atoms; an alkoxy group having 1 to 20 carbon atoms; an alkenyl group having 2 to 20 carbon atoms; an alkenyloxy group having 2 to 20 carbon atoms; or an alkynyl group having 2 to 20 carbon atoms; the alicyclic hydrocarbon group may be a cycloalkyl group having 4 to 20 carbon atoms; a cycloalkenyl group having 4 to 20 carbon atoms; or a heterocycloalkyl group having 2 to 20 carbon atoms; and the aromatic hydrocarbon group may be an aryl group having 6 to 20 carbon atoms; or a heteroaryl group having 2 to 20 carbon atoms.

In addition, R2 may be hydrogen, a methyl group, an ethyl group, a propyl group, an isopropyl group, a butyl group, an isobutyl group, a tert-butyl group, a sec-butyl group, a vinyl group, an allyl group, a butenyl group, a pentenyl group, an ethynyl group, a propynyl group, a butynyl group, a pentynyl group, a cyclobutyl group, a cyclopentyl group, a cyclohexyl group, a cycloheptyl group, a phenyl group, a naphthyl group, a pyridinyl group or a thiopheny group.

The sulfonylmethyl isocyanide-based compound has charges in the molecule even in a neutral state, and may have superior reactivity compared to a polar organic solvent. For example, the sulfonylmethyl isocyanide-based compound is reduced at a higher voltage than a polar organic solvent, and may be reduced on a negative electrode surface before the polar solvent is reduced when charging a battery as a charging voltage decreases from an open voltage. Accordingly, in the additive-included electrolyte liquid, a new film is formed at the negative electrode interface during first charge, and an additional reduction reaction of the electrolyte may be suppressed thereafter since a voltage of a reductive decomposition reaction of the polar organic solvent changes on this film. By the formation of the new film, battery resistance increases, and as a result, battery capacity and lifetime property may not be reduced while enhancing battery stability.

The present invention also relates to a lithium secondary battery comprising a positive electrode, a negative electrode, a separator provided therebetween, a gel polymer electrolyte and a liquid electrolyte, wherein the gel polymer electrolyte is included between the negative electrode and separator, the liquid electrolyte is included between the positive electrode and the separator, and an electrolyte liquid is impregnated into a polymer matrix in 30% by weight or less in the gel polymer electrolyte.

In other words, the gel polymer electrolyte and the liquid electrolyte may be included in the negative electrode side and the positive electrode side, respectively, or, on the contrary, may also be included in the positive electrode side and the negative electrode side, respectively.

Hereinafter, preferred examples will be provided in order to illuminate the present invention, however, the following examples are for illustrative purposes only, and it will be obvious to those skilled in the art that various changes and modifications may be made within the scope and technological ideas of the present invention, and such changes and modifications also belong to the scope of the attached claims.

Preparation Example: Manufacture of Li/Li Symmetric Cell

Preparation Example 1

A lithium metal thin film having a thickness of 20 μm was used as a negative electrode. An electrolyte liquid was prepared by dissolving 1 M concentration of lithium bisfluorosulfonyl imide (LiFSI) in an organic solvent formed with 1,3-dioxolane and ethylene glycol dimethyl ether (DOL:DME=1:1 (volume ratio)).

A Li/Li symmetric cell was manufactured using the negative electrode and the electrolyte liquid.

Preparation Example 2

A Li/Li symmetric cell was manufactured in the same manner as in Preparation Example 1 except that the electrolyte liquid was prepared by dissolving 1 M concentration of lithium hexafluorophosphate (LiPF$_6$) in an organic solvent formed with ethylene carbonate, diethyl carbonate and dimethyl carbonate (EC:DEC:DMC=1:2:1 (volume ratio), and adding 2% by weight of vinylene carbonate (VC).

EXAMPLE AND COMPARATIVE EXAMPLE

Example 1

After preparing positive electrode active material slurry including LiCoO$_2$ as a positive electrode active material, Super P as a conductor and polyvinylidene fluoride (PVDF) as a binder in 95% by weight, 2.5% by weight and 2.5% by weight, respectively, the positive electrode active material slurry was coated on an aluminum current collector, and then the result was dried to prepare a positive electrode.

A lithium metal thin film having a thickness of 20 μm was used as a negative electrode.

As a crosslinked polymer for forming a polymer matrix, trimethylolpropane ethoxylate triacrylate was used.

An electrolyte liquid to be impregnated into the polymer matrix was prepared by dissolving 1 M concentration of lithium bisfluorosulfonyl imide (LiFSI) in an organic solvent formed with dioxolane and ethylene glycol dimethyl ether (DOL:DME=1:1 (volume ratio)).

A crude gel polymer liquid was prepared using a mixture of 85% by weight of the crosslinked polymer (trimethylolpropane ethoxylate triacrylate) and 15% by weight of the prepared electrolyte liquid, and 1% by weight of 2-hydroxy-2-methylpropiophenone with respect to the weight of the crosslinked polymer was mixed thereto as a curing agent to prepare the crude gel polymer liquid.

After coating the crude liquid on one surface of the negative electrode, the result was UV cured with 1195 mJ/cm$^2$ to form a gel polymer electrolyte on the negative electrode surface to a thickness of 5 μm.

After placing the gel polymer electrolyte-formed negative electrode and the positive electrode to face each other, a polyethylene separator was provided between the positive electrode and the negative electrode to prepare an electrode assembly.

After inserting the electrode assembly into a coin cell, an electrolyte liquid obtained by dissolving 1 M concentration of lithium hexafluorophosphate (LiPF$_6$) in an organic solvent formed with dimethyl carbonate (EC:DEC:DMC=1:2:1 (volume ratio)) and adding 2% by weight of VC was injected between the positive electrode and the separator, and the result was completely sealed to manufacture a lithium secondary battery.

Example 2

A lithium secondary battery was manufactured in the same manner as in Example 1, except that the lithium secondary battery includes a gel polymer electrolyte formed using 95% by weight of the crosslinked polymer and 5% by weight of the prepared electrolyte liquid.

Example 3

A lithium secondary battery was manufactured in the same manner as in Example 1, except that the lithium secondary battery includes a gel polymer electrolyte formed using 75% by weight of the crosslinked polymer and 25% by weight of the prepared electrolyte liquid.

Comparative Example 1

After inserting an electrode assembly having a polyethylene separator provided between a positive electrode and a negative electrode into a coin cell in the same manner as in Example 1, 100 μl of an electrolyte liquid obtained by dissolving 1 M concentration of lithium bisfluorosulfonyl imide (LiFSI) in an organic solvent formed with ethylene glycol dimethyl ether (DOL:DME=1:1 (volume ratio)) was injected thereto. After that, the result was completely sealed to manufacture a lithium secondary battery.

Comparative Example 2

After inserting an electrode assembly having a polyethylene separator provided between a positive electrode and a negative electrode into a coin cell in the same manner as in Example 1, 100 µl of an electrolyte liquid obtained by dissolving 1 M concentration of lithium hexafluorophosphate (LiPF$_6$) in an organic solvent formed with dimethyl carbonate (EC:DEC:DMC=1:2:1 (volume ratio)) and adding 2% by weight of VC was injected thereto. After that, the result was completely sealed to manufacture a lithium secondary battery.

Comparative Example 3

A lithium secondary battery was manufactured in the same manner as in Example 1, except that the lithium secondary battery includes a gel polymer electrolyte formed using 60% by weight of the crosslinked polymer and 40% by weight of the prepared electrolyte liquid.

Comparative Example 4

A lithium secondary battery was manufactured in the same manner as in Example 1, except that, when forming the gel polymer electrolyte, polyethylene oxide was used instead of trimethylolpropane ethoxylate triacrylate, the crosslinked polymer.

Experimental Example 1. Performance Evaluation on Symmetric Cell

The symmetric cells manufactured in Preparation Examples 1 and 2 were charged and discharged under a charge and discharge condition of 83% depth of discharge (DOD), and 1 C. After the charge and discharge, cycle efficiency (%) was measured, and the results are shown in the following Table 1.

TABLE 1

|  | Li Cycle Efficiency (%) |
| --- | --- |
| Preparation Example 1 | 99.42 |
| Preparation Example 2 | 94.64 |

When referring to Table 1, it was identified that, when a negative electrode is lithium metal, Li efficiency increased when including an ether-based solvent as in Preparation Example 1 compared to Preparation Example 2 using a carbonate-based solvent.

Experimental Example 2. Performance Evaluation on Lithium Secondary Battery

Each of the lithium secondary batteries (battery capacity 4.6 mAh) manufactured in the example and the comparative examples was charged to 4.6 V with a constant current of 0.7 C at 55° C., then charged with a constant voltage of 4.6 V, and the charge was terminated when the charge current became 0.275 mA. After that, the battery was left unattended for 10 minutes and discharged to 3.0 V with a constant current of 0.5 C. Battery capacity was measured after performing the charge and discharge for 100 cycles, and then the number of cycles maintaining 80% with respect to initial capacity was measured. The results are shown in Table 2.

TABLE 2

|  | Number of Cycles Maintaining 80% with Respect to Initial Capacity |
| --- | --- |
| Example 1 | 78 |
| Example 2 | 40 |
| Example 3 | 53 |
| Comparative Example 1 | 3 |
| Comparative Example 2 | 17 |
| Comparative Example 3 | 8 |
| Comparative Example 4 | 7 |

Based on the result shown in Table 2, it was seen that Example 1 exhibited an excellent capacity property by maintaining 80% with respect to initial capacity until the number of cycles reached 78, and it was seen that Examples 2 and 3 also exhibited an excellent capacity property compared to the comparative examples.

When the electrolyte liquid content was 5% by weight as in Example 2, an effect of mixing two electrolyte liquids was not obtained, however, it was seen that battery degeneration was somewhat rapid compared to Example 1 due to cell resistance caused by a low electrolyte liquid content.

When the electrolyte liquid content was 25% by weight as in Example 3, an effect of mixing two electrolyte liquids was not observed, however, some of the solvent of the electrolyte liquid electrochemically reacted with the lithium negative electrode to form an unstable SEI layer causing rapid battery degeneration compared to Example 1.

Meanwhile, Comparative Examples 1 to 4 exhibited a poor capacity property compared to Example 1.

Comparative Example 1 was considered to go through rapid early battery degeneration due to the positive electrode oxidation reaction of the ether-based electrolyte liquid vulnerable to high voltage stability. Comparative Example 2 was stable in the positive electrode but had reduced battery capacity before 20 cycles due to low efficiency of the lithium negative electrode, and it was seen that, in Comparative Examples 3 and 4, an oxidation reaction occurring in the positive electrode by the mixing of two electrolyte liquids affected a decrease in the capacity.

REFERENCE NUMERAL

100: Lithium Secondary Battery
10: Negative Electrode
20: Positive Electrode
30: Electrolyte
31: Gel Polymer Electrolyte
31a: Polymer Matrix
31b: Electrolyte Liquid
32: Liquid Electrolyte
40: Separator

The invention claimed is:
1. A lithium secondary battery comprising:
a positive electrode;
a negative electrode;
a separator provided between the positive electrode and the negative electrode;

a gel polymer electrolyte included between the negative electrode and the separator, said gel polymer electrolyte comprising an electrolyte liquid and a polymer matrix, wherein the electrolyte liquid is impregnated into the polymer matrix in an amount of 10% by weight to 20% by weight with respect to a total weight of the gel polymer electrolyte in the gel polymer electrolyte; and a liquid electrolyte included between the positive electrode and the separator, wherein the electrolyte liquid included in the gel polymer electrolyte comprises an ether-based solvent and a lithium salt, and the liquid electrolyte included between the positive electrode and the separator comprises a carbonate-based solvent and a lithium salt, wherein the polymer matrix consists of a monomer having two functional groups, wherein the monomer having two functional groups is one or more selected from the group consisting of trimethylolpropane ethoxylate triacrylate, divinyl ether, trimethylolpropane, and trimethylolpropane trimethacrylate.

2. The lithium secondary battery of claim 1, wherein the negative electrode comprises lithium metal or a lithium alloy.

3. The lithium secondary battery of claim 1, wherein the ether-based solvent is one or more types selected from the group consisting of dimethyl ether, diethyl ether, dibutyl ether, ethylene glycol dimethyl ether, diethylene glycol dimethyl ether, diethylene glycol diethyl ether, triethylene glycol dimethyl ether, triethylene glycol diethyl ether, 1,3-dioxolane, 4-methyl dioxolane, 1,4-dioxane, 3,5-dimethyl isoxazole, 2,5-dimethylfuran, furan, 2-methylfuran, tetrahydrofuran and 2-methyltetrahydrofuran.

4. The lithium secondary battery of claim 1, wherein the carbonate-based solvent is one or more types selected from the group consisting of ethylene carbonate, propylene carbonate, 1,2-butylene carbonate, 2,3-butylene carbonate, 2,3-pentylene carbonate, dimethyl carbonate, diethyl carbonate, ethylmethyl carbonate, dipropyl carbonate, methylpropyl carbonate and ethylpropyl carbonate.

5. The lithium secondary battery of claim 1, wherein (1) the gel polymer electrolyte included between the negative electrode and the separator or (2) the liquid electrolyte included between the positive electrode and the separator further comprises an additive, and the additive comprises a sulfonylmethyl isocyanide-based compound represented by the following Chemical Formula 1:

[Chemical Formula 1]

in the formula, $R_1$ is a substituted or unsubstituted alkyl group having 1 to 20 carbon atoms; an alkoxy group having 1 to 20 carbon atoms; an alkenyl group having 2 to 20 carbon atoms; an alkenyloxy group having 2 to 20 carbon atoms; a cycloalkyl group having 4 to 20 carbon atoms; a cycloalkenyl group having 4 to 20 carbon atoms; an alkynyl group having 2 to 20 carbon atoms; an aryl group having 6 to 20 carbon atoms; and $R_2$ is a substituted or unsubstituted aliphatic, alicyclic or aromatic hydrocarbon group.

6. A lithium secondary battery comprising:
a positive electrode;
a negative electrode; and
a separator provided between the positive electrode and the negative electrode;
a liquid electrolyte included between the negative electrode and the separator; and
a gel polymer electrolyte included between the positive electrode and the separator, said gel polymer electrolyte comprising an electrolyte liquid and a polymer matrix, wherein the electrolyte liquid is impregnated into the polymer matrix in an amount of 10% by weight to 20% by weight with respect to a total weight of the gel polymer electrolyte in the gel polymer electrolyte, wherein the liquid electrolyte included between the negative electrode and the separator comprises an ether-based solvent and a lithium salt, and the electrolyte liquid included in the gel polymer electrolyte comprises a carbonate-based solvent and a lithium salt, wherein the polymer matrix consists of a monomer having two functional groups, wherein the monomer having two functional groups is one or more selected from the group consisting of trimethylolpropane ethoxylate triacrylate, divinyl ether, trimethylolpropane, and trimethylolpropane trimethacrylate.

7. The lithium secondary battery of claim 1, wherein the polymer matrix consists of trimethylolpropane ethoxylate triacrylate.

8. The lithium secondary battery of claim 6, wherein the polymer matrix consists of trimethylolpropane ethoxylate triacrylate.

* * * * *